United States Patent
Hausmann

(10) Patent No.: US 6,933,768 B2
(45) Date of Patent: Aug. 23, 2005

(54) METHOD FOR INCREASING THE INPUT VOLTAGE OF AN INTEGRATED CIRCUIT WITH A TWO-STAGE CHARGE PUMP, AND INTEGRATED CIRCUIT

(75) Inventor: Michael Hausmann, Unterhaching (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 10/600,961

(22) Filed: Jun. 20, 2003

(65) Prior Publication Data

US 2005/0077949 A1 Apr. 14, 2005

(30) Foreign Application Priority Data

Jun. 20, 2002 (DE) .......................................... 102 27 375

(51) Int. Cl.[7] .............................. G06F 1/10; H02M 3/18
(52) U.S. Cl. ....................................................... 327/536
(58) Field of Search ................................ 327/298, 536, 327/537, 589; 363/59, 60, 63

(56) References Cited

U.S. PATENT DOCUMENTS

| 4,807,104 A | * | 2/1989 | Floyd et al. ................... 363/59 |
| 5,774,390 A | | 6/1998 | Tailliet |
| 6,628,252 B2 | * | 9/2003 | Hoshino et al. ............... 345/82 |
| 6,834,001 B2 | * | 12/2004 | Myono ......................... 363/60 |
| 2003/0230758 A1 | | 12/2003 | Hausmann et al. ......... 257/100 |

FOREIGN PATENT DOCUMENTS

| DE | 693 20 080 T2 | 9/1993 |
| DE | 44 43 690 A1 | 6/1996 |
| DE | 696 01 976 T2 | 12/1996 |
| DE | 102 19 783 A1 | 11/2003 |
| EP | 0 257 810 A2 | 3/1988 |
| EP | 0 558 339 A2 | 9/1993 |

* cited by examiner

Primary Examiner—Dinh T. Le
(74) Attorney, Agent, or Firm—Laurence A. Greenberg; Werner H. Stemer; Ralph E. Locher

(57) ABSTRACT

Integrated circuits with charge pumps are frequently used for supplying integrated circuits, in particular memory circuits, with energy. When the input voltages are low, at about 2V or less, the required operating voltage may be less than the required 2.5V or 3.3V. In that case it is no longer ensured that the integrated circuit will operate reliably. A two-stage charge pump is thus provided, in which the second stage is connected with its capacitor in parallel with the first stage. The parallel circuit allows the ratio of the two capacitances to be determined largely freely as a function of predetermined parameters, such as the current, the voltage and the required area. Furthermore, this also has the advantage over a series circuit that, when the two capacitances are connected in parallel, they are added linearly, so that the capacitance size can be defined largely independently and freely.

10 Claims, 2 Drawing Sheets

METHOD FOR INCREASING THE INPUT VOLTAGE OF AN INTEGRATED CIRCUIT WITH A TWO-STAGE CHARGE PUMP, AND INTEGRATED CIRCUIT

BACKGROUND OF THE INVENTION

Field of the Invention

The invention lies in the integrated technology field. More specifically, the invention relates to a method and an integrated circuit for increasing an input voltage, in which a charge pump is first of all used to precharge a first capacitor to the input voltage and, in a second step, its stored charge is converted to an increased output voltage.

Particularly in the case of portable electronic appliances such as radios, cellular phones, audio equipment, computers, cameras, and the like, it is frequently desirable to design these appliances to be as small and as light as possible. The number of batteries in one appliance in this case means an undesirably high space requirement and, furthermore, a correspondingly heavy weight as well. On the other hand, the assemblies, which are frequently in the form of an integrated circuit such as memories, amplifiers, etc., frequently require a specific minimum voltage in order to guarantee their functions, for physical reasons. Particularly in the case of dynamic memories such as DRAMs (Dynamic Random Access Memory) which, depending on the type, require a supply voltage of at least 2.5 volts or 3.3 volts, a continuous voltage supply is required in order to avoid the stored data being lost. Some integrated circuits also require two or more different operating voltages, which cannot be derived from a single battery without relatively major complexity.

A single battery cell, for example a NiCd cell, which generally outputs 1.2 to 1.5 volts depending on the type, is often inadequate for the problems mentioned above. This is particularly so when the battery cell has already been partially discharged and its voltage falls further when it is further subjected to a load.

Until now, attempts have been made to solve this problem, for example, by reducing the physical size of the batteries and then connecting two or more relatively small batteries in series in order to produce a higher voltage (input voltage). This has the disadvantage that the space required is still relatively large.

Voltage converters with transformers or the like have been used in the past in order to produce a higher voltage, in particular from a low voltage. However, these operate only with AC voltages and are thus not feasible without additional complexity for battery-powered appliances.

Furthermore, a pump circuit is known, having a charge pump, by means of which the input voltage can, for example, be doubled with acceptable complexity. The charge pump is in this case implemented on the chip of the integrated circuit, with appropriate capacitors being charged by way of MOSFET transistors as electronic switches. A single-stage charge pump has the disadvantage that the voltage cannot be more than doubled, and a relatively large chip area is required for greater current ratings.

A method and an integrated circuit for charge pumping are known from German patent application DE 44 43 690 A1. There, an input voltage is increased to a higher output voltage by way of capacitors that are connected in series.

SUMMARY OF THE INVENTION

It is accordingly an object of the invention to provide a pumping method and a corresponding circuit which overcome the above-mentioned disadvantages of the heretofore-known devices and methods of this general type and which are distinguished by an effective pumping response, with the capacitors at the same time requiring little space.

With the foregoing and other objects in view there is provided, in accordance with the invention, a method for increasing an input voltage of an integrated circuit, which comprises:

providing a charge pump with a first, a second, and a third capacitor connected to one another via a first switch, a second switch, a third switch, and a fourth switch;

cyclically connecting the capacitors to an input voltage and to ground, as follows:

in a first step, connecting the first capacitor and the second capacitor between the input voltage and ground, to precharge the first capacitor and the second capacitor to the input voltage;

in a second step, connecting the first capacitor and the second capacitor to one another, to the input voltage and to ground, to charge the second capacitor to a charge voltage corresponding to a ratio of a capacitance of the first capacitor to a capacitance of the second capacitor; and in a third step, connecting the second capacitor and the third capacitor to one another, to the input voltage and to ground, to charge the third capacitor to an output voltage higher than the input voltage.

The method according to the invention for increasing the input voltage, and the integrated circuit according to the invention, in contrast with the prior art, has the advantage that the use of a two-stage charge pump means that the input voltage can easily be raised to an increased value, for example to twice the value, with adequate current ratings and without the disadvantages mentioned above occurring. In this case, it is regarded as being particularly advantageous that the effective pump capacitance of the two capacitors can be increased linearly by connecting the two stages in parallel, while the effective pump capacitance is limited by the smallest capacitor when they are connected in series, as normal. This results in the further advantage that a relatively small chip area is required, since the ratio of the two capacitors need not necessarily be 1:1. A further advantage is also that a predetermined parameter can be controlled in a particularly simple manner by the ratio of the two capacitances of the two capacitors. A particularly simple solution is obtained by increasing the output voltage in only three steps. These steps are then, of course, repeated cyclically.

In this case, it is regarded as being particularly advantageous that the ratio of the two capacitances can be chosen freely as a function of the available area on the integrated circuit. Since the integrated area on the chip for the two capacitors is proportional to their capacitances, the capacitance ratio can be defined very easily and virtually independently in this way.

Another advantageous alternative solution is for the capacitance ratio to be defined as a function of the output voltage which is to be increased.

In practice, it has been found to be an optimum solution for the capacitance ratio to be defined such that the charge voltage on the second capacitor is raised to about 4/3 times the input voltage. This has the advantage that the first capacitor need have only half the capacitance in this case. In consequence, only about half the chip area is required for the first capacitor, as well. This therefore saves chip area in comparison to conventional pump circuits.

Another advantageous solution is for the capacitor areas to be chosen as a function of the usable current. The capacitor areas are chosen to be greater for higher currents than for lower currents. The required chip area can be optimized very easily in this way.

In order to achieve a supply voltage (output voltage) of Vpp≧2.8V which is still sufficient for memory circuits such as DRAMs, for example, with low input voltages, for example of Vint≦1.8V, the ratio of the two capacitors can be defined in a correspondingly simple manner.

With regard to the integrated circuit, it is particularly advantageous for the individual steps for charging and reversal of the charge on the capacitors to be controlled by means of electronic switches. Electronic switches such as these are generally in the form of MOSFET transistors, which can be controlled very easily. In particular, a minimum of only four electronic switches are required to control the charge pump.

This simple charge pump is particularly advantageous for supplying memory circuits such as DRAMs, since it requires relatively little area on the chip.

Other features which are considered as characteristic for the invention are set forth in the appended claims.

Although the invention is illustrated and described herein as embodied in a method for increasing the input voltage of an integrated circuit by means of a two-stage charge pump, as well as an integrated circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
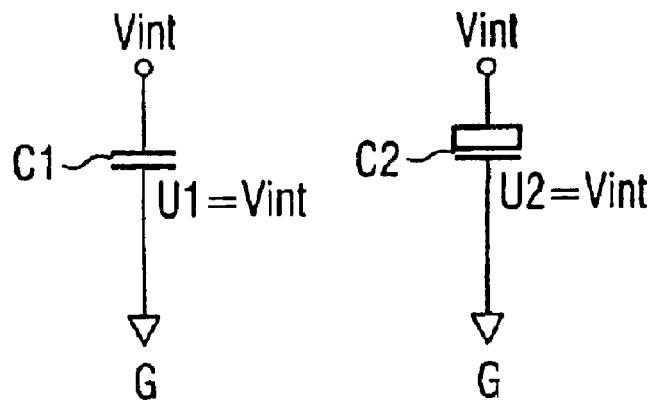
FIGS. 1A, 1B, and 1C are simplified schematic diagrams of one exemplary embodiment of the invention, in which the output voltage can be raised to a desired value in three process steps using a two-stage charge pump.
Figure 1B:
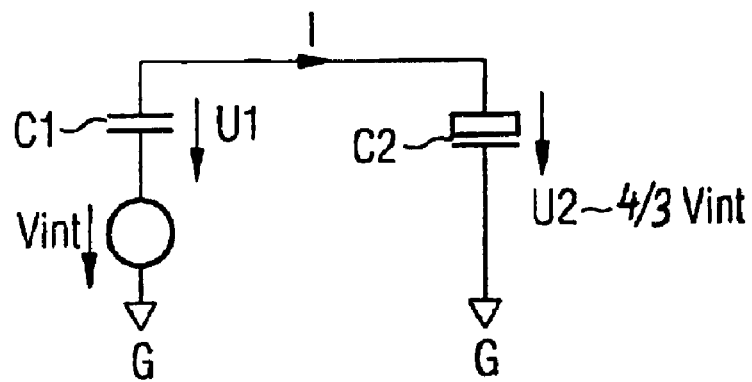
Figure 1C:
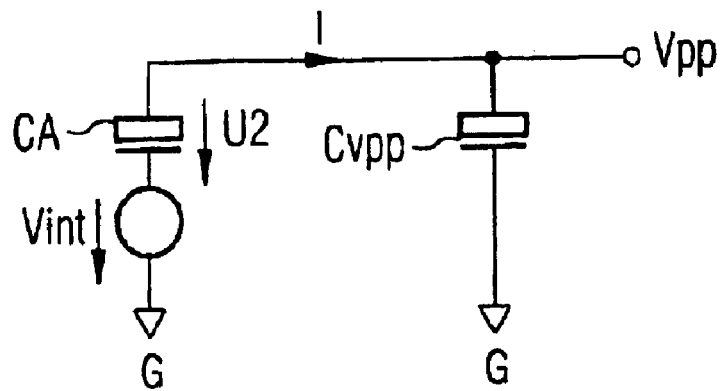

Referring now to the figures of the drawing in detail and first, particularly, to FIGS. 1A, 1B, and 1C thereof, the three process steps illustrated are used to cyclically carry out the voltage increase. FIG. 1A provides a schematic illustration of the two stages of the charge pump. They are primarily formed by a first capacitor C1 and a second capacitor C2. In this case, in a first step, one connection of the two capacitors C1, C2 is connected to the input voltage Vint, and their second connection is connected to ground G. The actual switching processes using the electronic switches that are required will be explained in more detail later with reference to FIGS. 2 and 3.

Thus, in this first process step, the two capacitors C1, C2 in the two stages are first of all precharged at the same time to the input voltage U1=Vint and U2=Vint, respectively. The difference in the illustration of the two capacitors C1, C2 in FIG. 1A is intended to indicate that the capacitances of the two capacitors C1, C2 may have different magnitudes. As integrated components of an integrated circuit, for example of a memory circuit such as DRAM or the like, both their required area and the ratio of their capacitances can be chosen freely, or can be defined as a function of one or more predetermined parameters.

In a second step (pump phase), as shown in FIG. 1B, the second capacitor C2 is connected in parallel with a series circuit which is formed from the input voltage Vint and the voltage U1 of the precharged capacitor C1. By way of example, it is assumed that the capacitance of the first capacitor C1 is only half as great as that of the second capacitor C2 (C1=½ C2). Taking this capacitance ratio into account, a current I now flows into the second capacitor C2, which leads to a charge voltage (total voltage) of U2~4/3*Vint. The free connection of the capacitor C2 is in this case connected to ground G.

The ratio of the two capacitances may be defined as required and is in practice defined taking into account the available chip area and/or the desired output voltage Vpp. The current rating must also be taken into account in this case, and may be determined essentially by the integrated capacitor area.

As can be seen from FIG. 1C, an output capacitor Cvpp is now, in a third step, connected in parallel with a series circuit which is formed from the second capacitor C2 (which is charged to the voltage U2) and from the input voltage Vint. A current I now once again flows into the output capacitor Cvpp and charges it to the increased output voltage Vpp. The free connections are once again connected to ground G.

Figure 2:
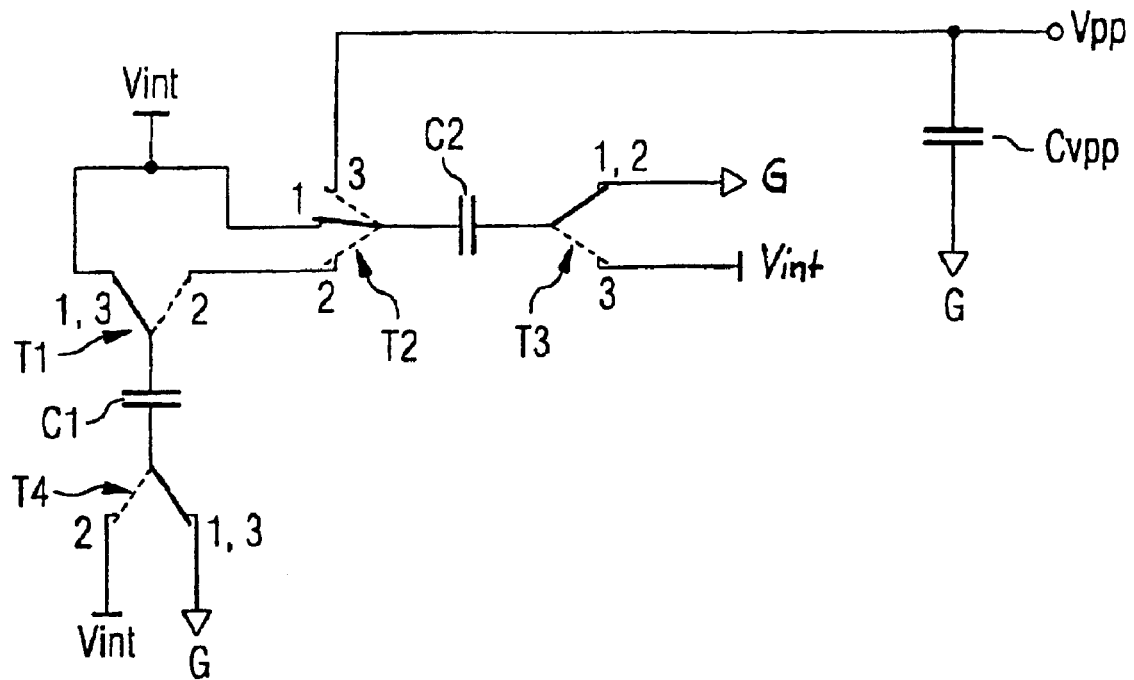
FIG. 2 is a schematic circuit diagram of a control circuit with electronic switches, by way of which the individual process steps according to the invention can be carried out.

FIG. 2 now shows a circuit diagram in which the individual steps, as they have been explained with reference to FIGS. 1A to 1C, are controlled by four electronic switches T1 . . . T4. The electronic switches T1 . . . T4 are preferably in the form of MOSFET transistors and are driven by control logic that is known per se but is not shown in FIG. 2, for reasons of clarity.

The switches T1, T3 and T4 are in the form of simple changeover switches with two switch positions. The switch T2 is in the form of a double changeover switch with a total of three switch positions.

The numbers 1, 2 and 3 denote the switch positions for the individual steps 1, 2 and 3. The capacitors C1, C2 and Cvpp correspond to those in FIGS. 1A to 1C.

The method of operation of this configuration will be explained in more detail in the following text. The solid contact positions correspond to the first step. As shown in FIG. 1A, the first capacitor C1 is at first precharged via the switches T1 and T4 to the voltage Vint. At the same time, the second capacitor C2 is also charged to the input voltage Vint via the switch T2. In this case, the connection for the output capacitor Cvpp is disconnected.

In the second step, the switch positions 2 are closed, and all the other switches are then opened. In a corresponding way to FIG. 1B, as has already been described, the second capacitor C2 is now charged to the charge voltage U2~4/3*Vint, shows that the switches T4, T1 and T2 have now been switched to the position 2. The switch T3 remains in its prior position.

As has been explained with reference to FIG. 1C, the charge is transferred to the output capacitor Cvpp in the third step. For this step, all four switches T1, T2, T3 and T4 are switched to the illustrated positions 3. A new cycle then starts once again with the step 1.

The period for which the switches are closed is preferably chosen to be of the same duration for each step, in order to make it possible to carry out all the steps cyclically using a control circuit that is as simple as possible. In an alternative refinement of the invention, it is, of course, also possible for the switches to be closed for different times.

Figure 3:
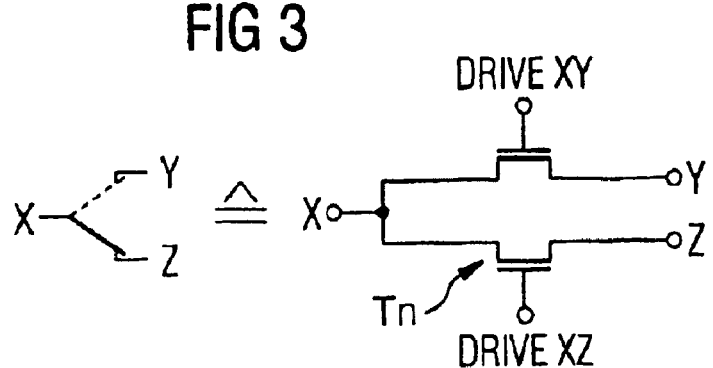
FIG. 3 is a diagram of a basic layout of an electronic switch.

FIG. 3 shows an electronic switch Tn which is in the form of a MOSFET transistor. The electrical circuit symbol with the two switch positions is shown in the left-hand part of FIG. 3. When a drive signal is applied to the connection DRIVE XY, the current path XY is closed, and when a drive is applied to the connection DRIVE XZ, the current path XZ is closed. The switches T1, T3 and T4 correspond to this switch type. A further control connection is provided for the switch T2.

I claim:

1. A method for increasing an input voltage of an integrated circuit, which comprises:

providing a charge pump with a first, a second, and a third capacitor connected to one another via a first switch, a second switch, a third switch, and a fourth switch;

cyclically connecting the capacitors to an input voltage and to ground, as follows:

in a first step, connecting the first capacitor and the second capacitor between the input voltage and ground, to precharge the first capacitor and the second capacitor to the input voltage;

in a second step, connecting the first capacitor and the second capacitor to one another, to the input voltage and to ground, to charge the second capacitor to a charge voltage corresponding to a ratio of a capacitance of the first capacitor to a capacitance of the second capacitor; and in a third step, connecting the second capacitor and the third capacitor to one another, to the input voltage and to ground, to charge the third capacitor to an output voltage higher than the input voltage.

2. The method according to claim 1, which comprises choosing the ratio of the capacitance of the first capacitor to the capacitance of the second capacitor in dependence on an available area on the integrated circuit.

3. The method according to claim 1, which comprises choosing the ratio of the capacitance of the first capacitor to the capacitance of the second capacitor in dependence on the output voltage to be increased.

4. The method according to claim 1, which comprises defining the ratio of the capacitance of the first capacitor to the capacitance of the second capacitor such that the charge voltage on the second capacitor rises to approximately 4/3 times the input voltage.

5. The method according to claim 4, which comprises choosing the ratio of the capacitance of the first capacitor to the capacitance of the second capacitor to be between 1 and 2.

6. The method according to claim 1, which comprises choosing capacitor size for the first and second capacitors in dependence on a usable current.

7. The method according to claim 1, which comprises setting capacitor sizes for the first and second capacitors such that an output voltage of $V_{pp} \geq 2.8$ V, with adequate current ratings, is obtained for the input voltage of $V_{int} \leq 1.8$V.

8. An integrated circuit with a charge pump for increasing an input voltage, comprising:

a first capacitor, a second capacitor, and a third capacitor a first switch, a second switch, a third switch, and a fourth switch for selectively connecting said first, second, and third capacitors to one another, to the input voltage, and to ground;

wherein said first switch, said second switch, said third switch, and said fourth switch a cyclically controlled such that:

in a first step, said first capacitor and said second capacitor are each connected between the input voltage and ground, for precharging said first capacitor and said second capacitor to the input voltage;

in a second step, said first capacitor and said second capacitor are connected to one another and are connected to the input voltage and to ground, for charging said second capacitor to a charge voltage corresponding to a ratio of a capacitance of said first capacitor and said second capacitor; and in a third step, said second capacitor and said third capacitor are connected to one another and are connected to the input voltage and to ground for charging said third capacitor to output voltage higher than the input voltage.

9. The integrated circuit according to claim 8 configured to supply a memory circuit.

10. The integrated circuit according to claim 9, wherein the memory circuit is a DRAM circuit.

* * * * *